J. DITCH.
Stocks for Shoeing Animals.
No. 144,963.  Patented Nov. 25, 1873.
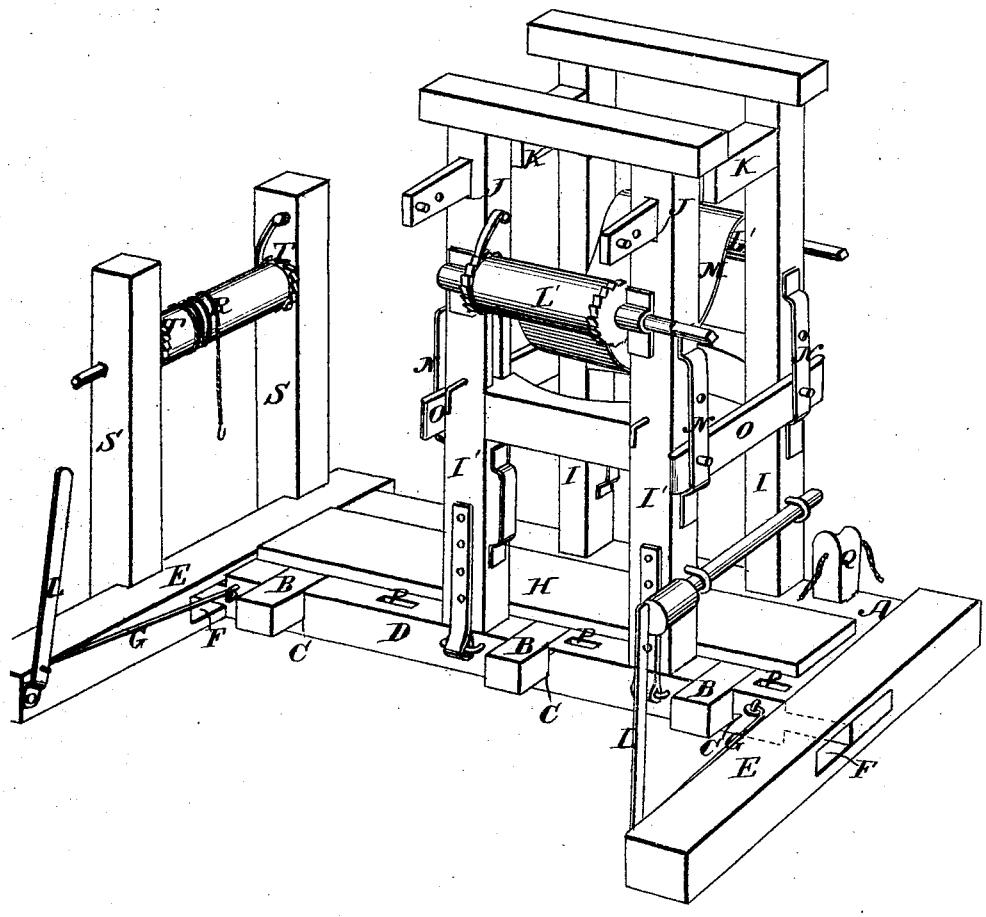

UNITED STATES PATENT OFFICE.

JACOB DITCH, OF FIVE FORKS, PENNSYLVANIA.

IMPROVEMENT IN STOCKS FOR SHOEING ANIMALS.

Specification forming part of Letters Patent No. 144,963, dated November 25, 1873; application filed August 8, 1873.

*To all whom it may concern:*

Be it known that I, JACOB DITCH, of Five Forks, in the county of Franklin and State of Pennsylvania, have invented a new and useful Improvement in Stocks for Confining Vicious Animals for the purpose of Shoeing, and for other purposes; and I do hereby declare the following to be a full and exact description of the same, reference being had to the accompanying drawings forming part of this specification, in which the figure is a perspective view of my invention.

Similar letters of reference in the accompanying drawings denote the same parts.

My invention relates to improvements in stocks for confining vicious animals for the purpose of shoeing, and for other purposes; and it consists in opening and closing the stocks for confining the animal by means of sliding one part of the bed backward or forward over the other, so as to open or close the stocks, and thereby reduce or increase the size of the space in which the animal is confined. My invention also consists in the employment, in stocks made to open and close as described, of rollers journaled in the vertical posts of the stocks, and connected by a belt, which, passing under the belly of the animal, will cause it to be raised or lowered as the stocks are opened and closed. My invention also consists in the employment of brackets or guides having perforations, in combination with bars extending from one post to another, and provided with pins and perforations for adjusting said cross-bars to the height of the animal to be shod. My invention also consists in the employment of a shifting-block provided at its lower end with a tenon, which can be inserted into different mortises made in the bed, by means of which either foot can be securely fastened for shoeing purposes. My invention further consists in the employment of a roller, attached to the head of the animal to confine it, as is hereinafter more fully set forth.

In the accompanying drawings, A is the bed of the stocks, having cross-bars B B rigidly secured thereto, which work in mortises or slots C C made in the movable longitudinal bar D. E E are the end pieces or bars of the bed, having slots F F, in which the tenoned ends of the movable bar D work. L L are levers fulcrumed to the end pieces E E, and provided with connecting-rods G G, which are securely attached to the movable bar D, to which is attached a portion, H, of the flooring, the other portion of the flooring being attached to the fixed part of the bed. I I are posts, securely fastened to the bed by mortise-and-tenon joints. I' I' are vertical posts, hinged to the movable longitudinal bar D, and provided at their upper ends with slots J J, which receive the tenoned ends of cross-pieces K K, the opposite extremities of which are secured to the vertical posts I I. L' L' are rollers, connected by a belt, M, and provided at their ends with ratchet-wheels, into which mesh pawls pivoted to the vertical posts. N N are guides or brackets, provided with perforations for the reception of pins, which pass through corresponding holes in cross-pieces O O inserted into the guides or brackets, the construction permitting the cross-pieces to be raised or lowered for confining animals of different heights. Similar brackets are also placed on the inner faces of the vertical posts. P P are mortises made in the bed of the machine for the reception of the tenoned block Q, having, preferably, a cord attached to its upper end to secure the foot of the animal to be shod, the upper end of the shifting-block Q being preferably rounded for the reception of the foot of the animal to be shod. By this construction, it will be seen that the block can readily be shifted, and either leg of the animal securely fastened. R is a roller, journaled in the vertical posts S S, and provided with a cord or its equivalent, to the inner end of which is a hook or its equivalent, which is fastened to the bridle or head-halter of the animal to be shod, thus confining the head of the animal. T T are ratchet-wheels on the end of the roller R, into which mesh pawls pivoted to the vertical posts S S.

The operation of the stocks is as follows: The levers L L are depressed and the stocks opened, and the animal is led or driven in, the horizontal cross-bars having been removed for that purpose. The levers L L are then raised and moved toward the animal confined, which moves in toward the animal one side of the stocks, thereby decreasing materially the space in which the animal is confined. The cross-bars O O are inserted in their guides or brackets, and adjusted to the height of the confined animal. The belt is then passed under the belly of the animal, the head having been confined by means of the cord passsing over the roller R. The levers L L are then moved backward, and the animal is raised from the ground as the vertical posts I' I' are moved out, and the animal can thus be suspended in the air, and either foot be shod by fastening it to the shifting-block.

It will be seen that, by my construction, the stocks are easily removed, and portable, and can readily be removed and set up again when desired.

Having thus described my invention, what I claim as new is—

1. The bed composed of the slotted end pieces E E and longitudinal bar provided with cross-pieces B B, in combination with the posts I I I' I' connected by cross-bars, longitudinal movable bar D provided with mortises, and levers L L to open and close the stocks, substantially as described, and for the purpose set forth.

2. The stationary bed A, having the uprights I I, carrying a roller, in combination with the movable bed D H, provided with uprights I' I', carrying a roller, belt M, levers L L, and connecting-rods G G, as and for the purpose set forth.

3. The stocks made to open and close, as described, with the brackets N N, provided with holes, and bars or cross-pieces O O, having perforations and pins, by means of which the bars may be adjusted to animals of different heights, substantially as described.

4. The stocks made to open and close, as described, when provided with mortises P P, in combination with the shifting-block Q, by means of which either foot of the animal confined can be securely fastened for shoeing, substantially as described.

5. The stocks made to open and close, as set forth, when provided with a roller, R, having a cord or its equivalent, in combination with the mortises P P and shifting-block Q, as and for the purpose set forth.

JACOB DITCH.

Witnesses:
   JNO. W. COON,
   H. M. SIBBET.